| United States Patent [19] | [11] 4,141,842 |
|---|---|
| Abdo | [45] Feb. 27, 1979 |

[54] WATERFLOOD OIL RECOVERY PROCESS EMPLOYING STABILIZED BIOPOLYMERS

[75] Inventor: Milton K. Abdo, Dallas, Tex.

[73] Assignee: Mobil Oil Corporation, New York, N.Y.

[21] Appl. No.: 782,141

[22] Filed: Mar. 28, 1977

[51] Int. Cl.$^2$ ............................................. E21B 43/22
[52] U.S. Cl. ................................. 252/8.55 D; 166/246
[58] Field of Search ...................... 252/8.55 D, 8.55 R; 166/246

[56] References Cited

U.S. PATENT DOCUMENTS

| 3,079,336 | 2/1963 | Stright et al. ........................ 252/8.55 |
|---|---|---|
| 3,305,016 | 2/1967 | Lindblom et al. ............... 252/8.55 X |
| 3,532,166 | 10/1970 | Williams ......................... 252/8.55 X |
| 3,637,017 | 1/1972 | Gale et al. .......................... 166/274 |
| 3,801,502 | 4/1974 | Hitzman .......................... 166/275 X |

*Primary Examiner*—Herbert B. Guynn
*Attorney, Agent, or Firm*—C. A. Huggett; William D. Jackson

[57] ABSTRACT

Waterflood oil recovery process employing a Xanthomonas polysaccharide as a thickening agent in which the aqueous polysaccharide solution contains a $C_3$-$C_5$ aliphatic alcohol. The aliphatic alcohol functions to stabilize the polysaccharide against thermal degradation in reservoirs having temperatures in excess of 60° C. The polysaccharide solution may also contain an alkali metal carbonate which functions with the alcohol to impart further stability to the Xanthomonas polysaccharide solution.

10 Claims, 3 Drawing Figures

WATERFLOOD OIL RECOVERY PROCESS EMPLOYING STABILIZED BIOPOLYMERS

BACKGROUND OF THE INVENTION

This invention relates to the recovery of oil from subterranean oil reservoirs and more particularly to improved waterflooding operations involving the injection of thickened aqueous liquids for mobility control.

In the recovery of oil from oil-bearing reservoirs, it is usually possible to recover only minor portions of the original oil in place by the so-called primary recovery methods which utilize only the natural forces present in the reservoir. Thus a variety of supplemental recovery techniques have been employed in order to increase the recovery of oil from subterranean reservoirs. The most widely used supplemental recovery technique is waterflooding which involves the injection of water into an oil-bearing reservoir. As the water moves through the reservoir, it acts to displace oil therein to a production system composed of one or more wells through which the oil is recovered.

One difficulty often encountered in waterflooding operations is the relatively poor sweep efficiency of the aqueous displacing medium; that is, the injected displacing medium tends to channel through certain portions of the reservoir as it travels from the injection system to the production system and to bypass other portions. Such poor sweep efficiency or macroscopic displacement efficiency may be due to a number of factors such as differences in the mobilities of the injected displacing liquids and the displaced reservoir oil and permeability variations within the reservoir which encourage preferential flow through some portions of the reservoir at the expense of other portions.

Various techniques have been proposed in order to improve the sweep efficiency of the injected displacing medium and thus avoid premature breakthrough at one or more of the wells comprising the production system. The most widely used procedure involves the addition of thickening agents to the injected displacing medium in order to increase the viscosity thereof and thus decrease its mobility to a value equal to or less than the mobility of the displaced reservoir oil, resulting in a "mobility ratio" of oil to water which is less than or equal to one. Many polymeric thickening agents have been proposed for use in such mobility control applications. One well known class of polymers which may be employed for this purpose is the group of polysaccharides produced by the action of bacteria of the genus Xanthomonas on carbohydrates as disclosed in U.S. Pat. No. 3,305,016 to Lindblom et al. As disclosed in this patent, these polysaccharides generally are employed in concentrations within the range of about 0.005–1.0 weight percent, with concentrations within the range of about 0.05–0.25 weight percent normally being preferred. Among the advantages attributed to these polysaccharides by Lindblom et al., are their usefulness in the presence of sodium chloride and other salts and their thermal stability and resistance to adsorption onto rock surfaces within a subterranean reservoir.

While Lindblom et al. refer to the thermal stability of the polysaccharides in the context of reservoir temperatures generally ranging between about 85° to 150° F., these polysaccharides are subject to thermal degradation which limits their application in relatively high temperature reservoirs. Waterflood oil recovery processes normally involve considerable lengths of time, on the order of months or several years, before recovery of oil from the formation is completed. Over such time intervals, the Xanthomonas polysaccharides such as disclosed in Lindblom et al. undergo significant thermal degradation at temperatures greater than about 60° C. (140° F.). Temperatures in excess of 60° C. are normally encountered in subterranean oil reservoirs at depths of about 4,000 feet or more.

As disclosed in U.S. Pat. No. 3,532,166 to Williams, Xanthomonas polysaccharides are also subject to adsorption onto reservoir rock surfaces. As disclosed in Williams, such adsorption may be retarded through the use of inorganic sacrificial agents such as water-soluble phosphates and/or water-soluble carbonates. Suitable water-soluble carbonates include the alkali metal carbonates such as sodium carbonate. The sacrificial agents may be employed in an aqueous solution injected prior to the polysaccharide solution or they may be added to the thickened polysaccharide solution.

The injected aqueous medium employed in waterflooding may contain various other additives in addition to the polymeric thickening agents. For example, the injected water may contain surface-active agents which reduce the interfacial tension between the injected water and oil or it may contain various agents such as alkaline agents which react with injected or indigenous material in the reservoir oil to produce surface-active agents within the reservoirs. Thus, U.S. Pat. No. 3,637,017 to Gale et al. discloses a waterflood oil recovery process employing various combinations of alcohols and surfactants. Surfactants disclosed for use in the Gale et al. process include petroleum sulfonates, and alcohols disclosed by the patentees include aliphatic alcohols having from 1 to 8 carbon atoms. The surfactant and alcohol may be injected simultaneously in an aqueous solution or the surfactant solution may be injected first and then followed by an aqueous solution of alcohol. Thickening agents may also be employed in the Gale et al. process. Thus, as disclosed in column 9 of Gale et al., a 2 percent solution of petroleum sulfonate containing also 0.75 weight percent sodium carbonate, 0.5 percent ammonia, and sufficient heteropolysaccharide of the type disclosed in the aforementioned Lindblom et al. patent to raise the viscosity of the surfactant solution to approximately 10 centipoises is injected. This surfactant solution is then displaced by water containing 2 percent by volume isobutanol and sufficient heteropolysaccharide to increase the viscosity of the solution to about 10 centipoises.

SUMMARY OF THE INVENTION

In accordance with the present invention, there is provided a new and improved waterflooding process employing a Xanthomonas polysaccharide as a thickening agent in subterranean oil reservoirs at temperatures in excess of 60° C. In carrying out the invention, at least a portion of the injected water is a viscous aqueous liquid containing a water dispersible polysaccharide produced by action of bacteria of the genus Xanthomonas on a carbohydrate and an aliphatic alcohol containing from 3–5 carbon atoms. In one aspect of the invention, the alcohol is a $C_3$–$C_5$ aliphatic alcohol present in a concentration within the range of 0.1–1.5 volume percent. In another aspect of the invention, the alcohol is isobutyl alcohol present in a concentration within the range of 0.1–9.0 volume percent and preferably in a concentration within a range of 0.1–2.0 volume percent.

In a preferred embodiment of the invention, the viscous aqueous liquid contains an alkali metal carbonate in addition to the polysaccharide and the $C_3$-$C_5$ aliphatic alcohol. In a more specific embodiment of the invention, the alcohol is n-butyl or isobutyl alcohol in a concentration within the range of 0.1–1.0 volume percent and the alkali metal carbonate is present in a concentration within the range of 0.001–0.01 weight percent.

DESCRIPTION OF SPECIFIC EMBODIMENTS

Figure 1:
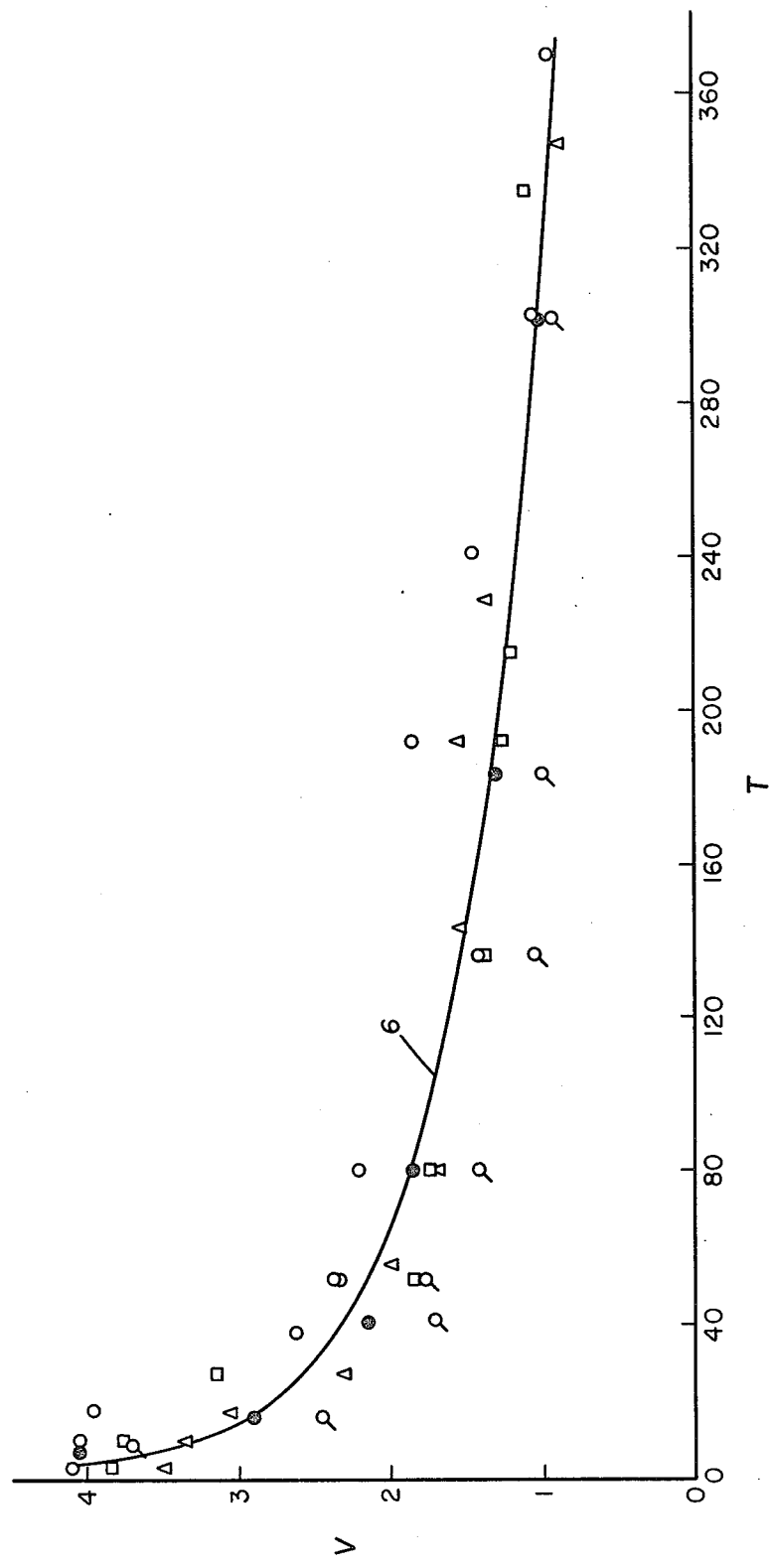
FIG. 1 is a graph illustrating the thermal degradation of aqueous solutions of a Xanthomonas polysaccharide.

The present invention involves a waterflooding process in which a polysaccharide produced by action of bacteria of the genus Xanthomonas on a carbohydrate is employed as a thickening agent and stabilized against thermal degradation by the use of certain aliphatic alcohols, either alone or in combination with alkali metal carbonates. Xanthomonas polysaccharides and their methods of preparation are well known to those skilled in the art, as disclosed for example in the aforementioned patent to Lindblom et al. and in U.S. Pat. No. 3,243,000 to Patton et al. Representative species of the genus Xanthomonas which may be employed to produce the polysaccharides include *Xanthomonas begoniae, Xanthomonas campestris, Xanthomonas carotae, Xanthomonas corylina, Xanthomonas gummisudans, Xanthomonas hederae, Xanthomonas incanae, Xanthomonas lespedezae, Xanthomonas malvacearum, Xanthomonas holcicola, Xanthomonas papavericola, Xanthomonas phaseoli, Xanthomonas pisi, Xanthomonas translucens, Xanthomonas vasculorum,* and *Xanthomonas vesicatoria.* A particular polysaccharide which is commercially available and is preferred for use in the present invention is the ionic polysaccharide B-1459 produced by fermentation of glucose with the bacterium *Xanthomonas campestris* NRRL B-1459, U.S. Department of Agriculture. This polysaccharide is produced by culturing the bacterium *Xanthomonas campestris* in a well aerated medium having a pH of about 7 which contains commercial glucose organic nitrogen sources, dipotassium hydrogen phosphate and appropriate trace elements. This polymer is available from the Kelco Chemical Company under trade name "Kelzan."

As noted previously Xanthomonas polysaccharides are subject to thermal degradation with an attendant loss in viscosity at reservoir temperatures in excess of 60° C. While many oil reservoirs in which waterflooding operations are carried out are at temperatures below 60° C., many more are at temperatures significantly above this level — particularly at depths of 4,000 feet or more. For example, reservoir temperatures as high as 80° or 100° C. are not uncommon. The present invention offers a process of employing Xanthomonas polysaccharide as a mobility control agent in carrying out waterflooding at these relatively high reservoir temperatures.

The alcohol employed to impart thermal stability to the Xanthomonas polysaccharide is a water-soluble $C_3$-$C_5$ aliphatic alcohol. Thus, the stabilizing alcohol may be selected from the group consisting of propyl-, butyl-, and amyl alcohol. Unsaturated alcohols such as allyl alcohol and crotyl alcohol may also be employed although the saturated alcohols normally will be used. Also while the propyl alcohols may be employed in carrying out the invention, they are relatively volatile and, depending upon the reservoir pressure, may exhibit a tendency to vaporize at the relatively high reservoir temperatures encountered. A similar consideration applies to tertiary butyl alcohol. Thus the preferred alcohols for use in carrying out the invention are the $C_4$-$C_5$ aliphatic alcohols and particularly isobutyl alcohol and n-butyl alcohol.

In order to illustrate the increase in thermal stability achieved in accordance with the present invention, aging tests were carried out for various Xanthomonas polysaccharide solutions with and without an alcohol and/or alkali metal carbonate stabilizing agent. In each case the biopolymer solution contained the commercially available Kelzan biopolymer in a concentration of 1,000 parts per million and 50 parts per million of a bactericide. The bactericide employed was sodium trichlorophenylate available from the Dow Chemical Company under the trade name "Dowicide B." As the samples were aged, their viscosities were measured periodically with a Brookfield viscometer at nominal shear rates ranging from 0.37 $sec^{-1}$ to 74 $sec^{-1}$. The viscosity data reported hereinafter is at a shear rate of 74 $sec^{-1}$. It is to be understood that various Kelzan dispersions tested were shear thinning and thus the viscosities at the lower shear rates were higher than those reported in the experimental data discussed hereinafter.

In a first suite of experiments carried out to establish a base case, samples were prepared by dispersing commercially available Kelzan from one "lot" in aqueous solutions of 1 weight percent, 2 weight percent, and 5 weight percent sodium chloride. Additional samples of commercially available Kelzan from two different "lots" were also prepared in 1 weight percent sodium chloride solutions. In each case the Kelzan concentration was 1,000 parts per million and each sample contained 50 parts per million of the previously mentioned Dowicide B bactericide. The samples were aged at 78° C. for a period slightly in excess of 1 year and viscosity measurements of each sample were taken periodically during the aging process.

The results of this suite of experiments are shown in FIG. 1 in which curve 6 is a graph of the viscosity, V, in centipoises plotted on the ordinate versus the time, T, in days on the abscissa. The viscosity values measured for the common lot Kelzan dispersions in the 1, 2, and 5 weight percent sodium chloride solutions are indicated by the symbols o, ●, and /⌐, respectively, and the viscosity measurements for the samples made up from the two additional lots of Kelzan in 1 percent sodium chloride solutions are indicated by the symbols □ and △.

Curve 6 in FIG. 1 is an interpolative curve drawn with approximately equal weight being given to all of the data points. From an examination of the individual data points, it can be seen that the viscosities did not vary significantly from one lot to another for the 1 percent sodium chloride solutions. The viscosities observed for the Kelzan solutions containing 2 and 5 weight percent sodium chloride were slightly lower than those observed for the 1 percent sodium chloride solution, although the differences here are probably not significant.

In further experimental work, Kelzan samples were aged at 25° C. for varying periods of time and then aged at 78° C. before viscosity measurements were taken at 78° C. In each case, the sample contained 1,000 ppm Kelzan and 50 ppm Dowicide B. The experimental data thus obtained is shown in Table I.

TABLE I

| Sample No. | Age, 25° C. | Age, 78° C. | Viscosity, 78° C. |
|---|---|---|---|
| 1 | Fresh | 77 | 2.42 |
| 2 | 3 | 77 | 1.97 |
| 3 | 7 | 77 | 1.60 |
| 4 | 14 | 77 | 1.48 |
| 5 | 21 | 77 | 1.43 |
| 6 | 35 | 77 | 1.20 |
| 7 | 56 | 77 | 1.15 |
| 8 | 157 | 77 | 0.90 |
| 9 | Fresh | 370 | 0.90 |

TABLE II

| Age, 25° C. | Viscosity, 25° C. | | |
|---|---|---|---|
| | 1.85 sec$^{-1}$ | 7.4 sec$^{-1}$ | 74 sec$^{-1}$ |
| Fresh | 24.4 | 18 | 7.5 |
| 15 | 26.0 | 19 | 7.8 |
| 185 | 19.6 | 14.5 | 7.4 |

In Table I, the second and third columns indicate the aging periods in days at 25° and 78° C., respectively, and the fourth column indicates the observed viscosity at 74 sec$^{-1}$. Thus Sample No. 3, for example, was aged at 25° C. for 7 days and then aged at 78° C. for 77 days at which point it had a viscosity, at 78° C., of 1.6 centipoises.

Table II illustrates viscosity data obtained at 25° C. for a sample of 1,000 ppm Kelzan in 1 percent sodium chloride solution aged at 25° C. In Table II the first column indicates the aging period in days and the second, third, and fourth columns indicate the viscosities in centipoises at 1.85, 7.4, and 74 sec$^{-1}$, respectively.

From an examination of the data presented in Table I, it would appear that the instability mechanism for the dispersed Kelzan is operative throughout the temperature interval from 25° C. to 78° C. A consideration of the data presented in Table II indicates that this mechanism becomes more pronounced as the temperature is elevated.

Figure 2:
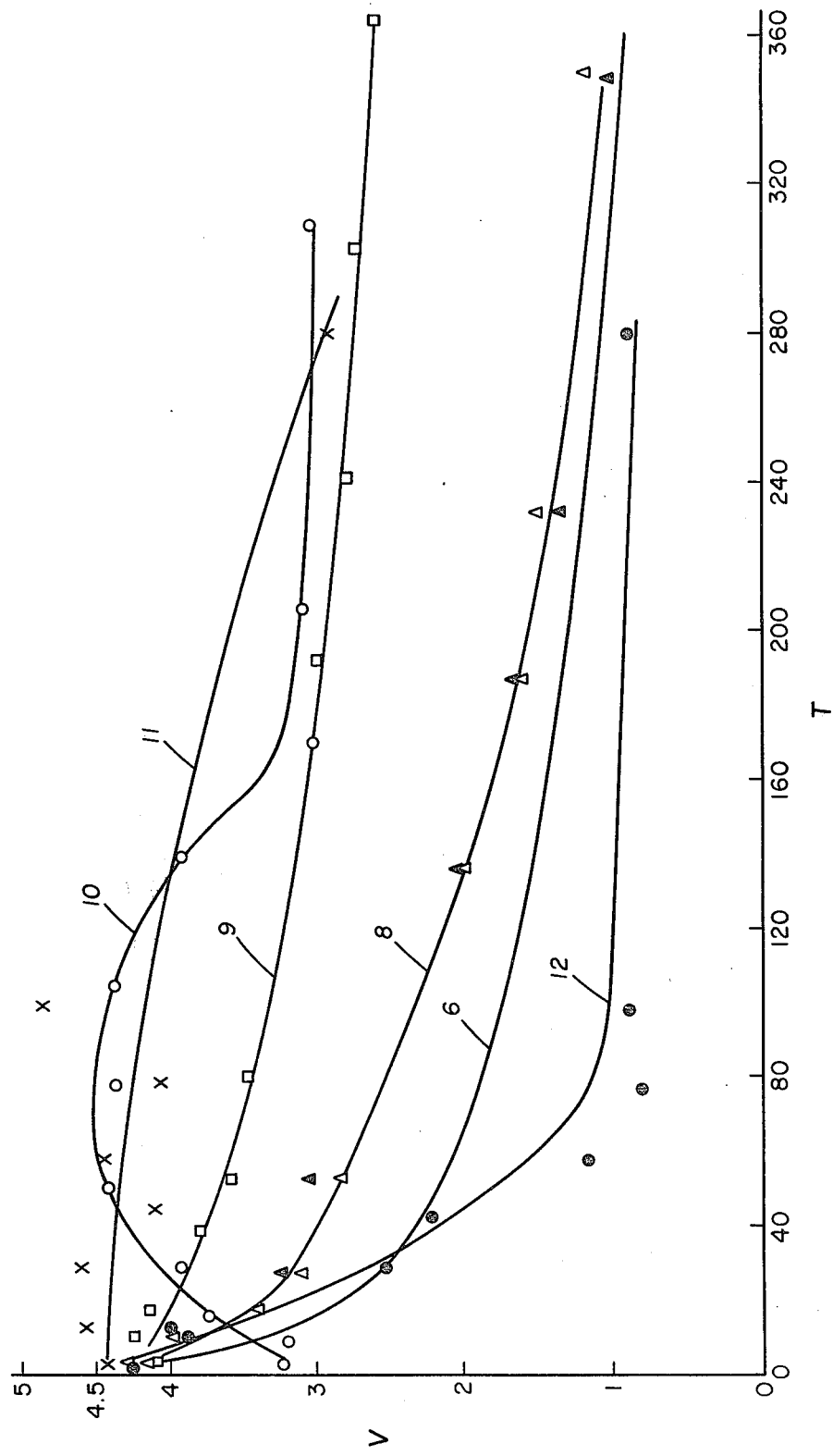
FIG. 2 is a graph illustrating the effect of certain alcohols on the thermal stability of Xanthomonas polysaccharide solutions.

A second suite of aging experiments was carried out for Kelzan solutions containing an alcohol or an alkali metal carbonate. The viscosities observed during these aging experiments are presented in FIG. 2 in which the curves shown are graphs of the viscosity, V, in centipoises at 74 sec$^{-1}$ plotted on the ordinate versus the time, T, in days plotted on the abscissa. In FIG. 2 the base curve 6 from FIG. 1 is replotted to establish a basis for comparison.

In one set of aging experiments, samples were prepared in which the base Kelzan system was modified by the addition of 25 and 100 ppm sodium carbonate. In FIG. 2, the data points showing the viscosities observed for the system containing 25 ppm sodium carbonate are indicated by the symbol ▲ and for the data points for the system containing 100 ppm sodium carbonate are indicated by the symbol △. As can be seen from an examination of the data points, the two systems behaved very similarly and a single curve 8 is drawn with respect to both sets of data points.

Curves 9 and 10 of FIG. 2 show the results of another set of aging experiments in which the base Kelzan system was modified by the addition of 2 volume percent isobutyl alcohol and 9 volume percent isobutyl alcohol, respectively. The data points for curves 9 and 10 are indicated by the symbols □ and o, respectively. As can be seen from an examination of curve 9, the addition of 2 volume percent of isobutyl alcohol significantly enhanced the thermal stability of the Kelzan system. As indicated by curve 10, the addition of 9 volume percent isobutyl alcohol conferred somewhat more thermal stability on the system, although at times beyond about 160 days there is only a small difference between the viscosities observed for the 2 volume percent and 9 volume percent alcohol systems. Thus while as much as 9 volume percent of isobutyl alcohol can be employed in accordance with the present invention, it normally will be preferred, for reasons of economy, to limit the isobutyl alcohol concentration to a value no greater than 2.0 volume percent.

Yet another set of experiments was carried out in which the base Kelzan system was modified by the addition of 0.5 volume percent n-butyl alcohol and 2.0 volume percent n-butyl alcohol. The viscosity measurements for the 0.5 volume percent n-butyl alcohol system are indicated in FIG. 2 by the data points X and curve 11, and for the 2 volume percent n-butyl alcohol system by the data points ⊙ and curve 12. As illustrated by curve 11, the addition of 0.5 volume percent n-butyl alcohol provided for a substantial increase in thermal stability throughout the time interval over which the measurements were taken. On the other hand, the system containing 2.0 volume percent n-butyl alcohol showed only a modest increase in thermal stability during the early portion of the aging process and, in fact, beyond about 40 days the addition of 2 volume percent n-butyl alcohol appeared to result in a decrease in thermal stability. The pH measurements taken during these aging experiments show that the reduced viscosity observed for the 2 volume percent n-butyl alcohol system was also accompanied by a decrease in pH from an initial value slightly in excess of 7 to a value of about 5 or 6 throughout most of the aging period. On the other hand, pH measurements taken for the 0.5 volume percent n-butyl alcohol system show that the pH increased almost immediately from an initial value of about 7.5 to values within the range of 9 to 10 throughout the aging process.

From an examination of the data presented in FIG. 2, it can be seen that while relatively large amounts of isobutyl alcohol may be employed, the somewhat less water-soluble n-butyl alcohol should be employed in more limited amounts. A similar consideration would apply also with respect to the amyl alcohols, with the exception of tertiary amyl alcohol which exhibits a water solubility similar to those of secondary butyl and isobutyl alcohols. Thus where these relatively less soluble alcohols are employed, they should be present in an amount no greater than 1.5 volume percent, and preferably in an amount no greater than 1.0 volume percent. A more specific upper limit, with respect to the use of n-butyl alcohol, is 0.5 volume percent whether employed alone or as described hereinafter in combination with an alkali metal carbonate.

Figure 3:
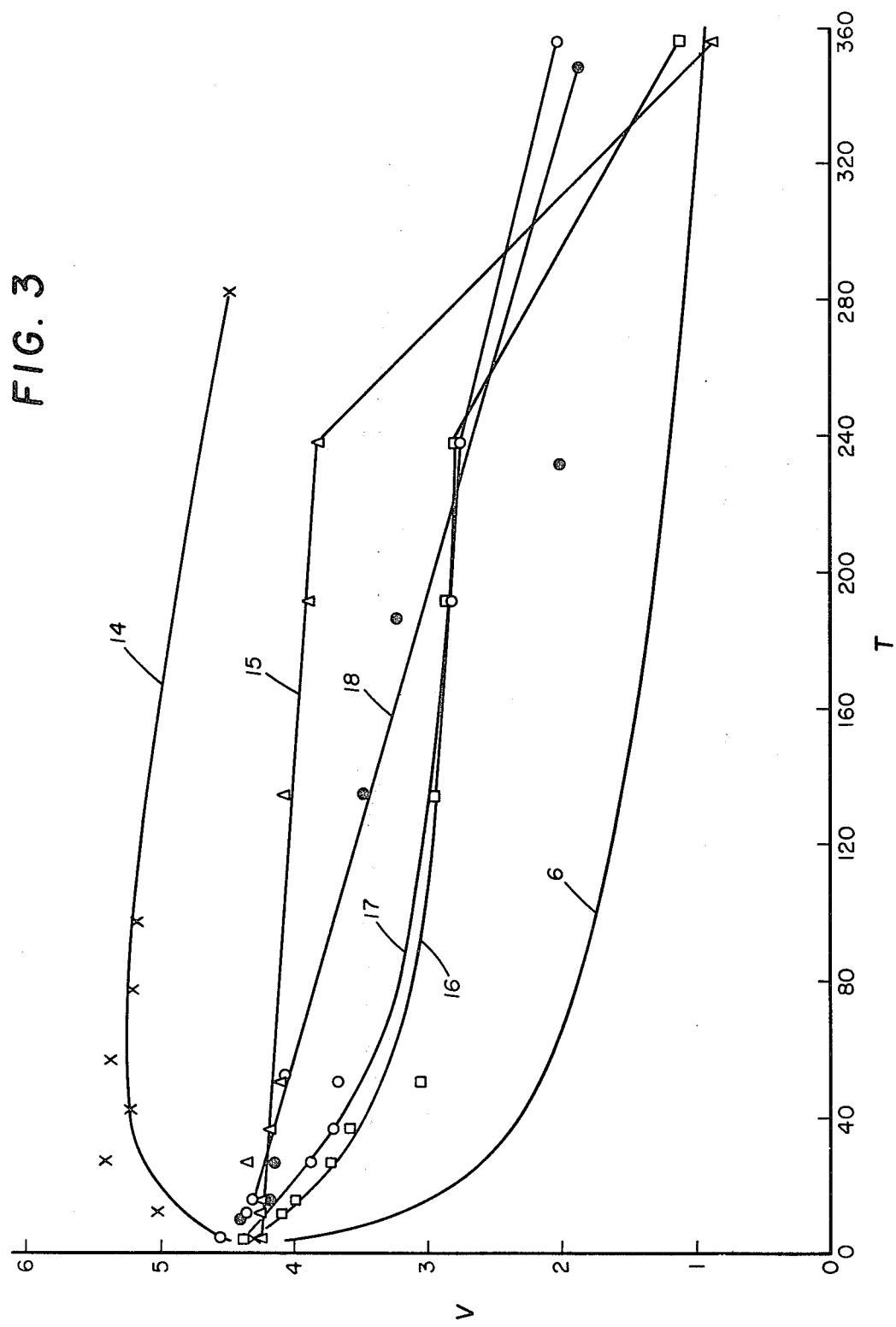
FIG. 3 is a graph illustrating the effect of mixtures of certain alcohols and alkali metal carbonates on the thermal stability of Xanthomonas polysaccharide solutions.

A third suite of aging experiments was carried out employing Kelzan systems containing both an alcohol and an alkali metal carbonate. It will be recalled from the data presented previously that the addition of 25 or 100 ppm of sodium carbonate to the base Kelzan system resulted in only a small increase in the thermal stability of the Kelzan system. However, when an alkali metal carbonate is employed in conjunction with even relatively small amounts of alcohol, a significant increase in thermal stability is observed. The results of these aging experiments are illustrated in FIG. 3 in which the curves shown are graphs of the viscosity, V, in centipoises measured at 74 sec$^{-1}$ on the ordinate versus the aging time, T, in days on the abscissa. In FIG. 3, curve 14 and the data points indicated by the symbols X illustrate the viscosity measurements taken for a sample in which the base Kelzan system (1,000 ppm Kelzan and 50 ppm Dowicide B in a 1 percent sodium chloride solution) was modified by addition of 0.5 volume percent n-butyl alcohol and 50 ppm sodium carbonate. Curves 15 (data points Δ) and 16 (data points □) illustrate viscosities observed for base Kelzan systems modified by the addition of 0.1 volume percent isobutyl alcohol and 10 ppm sodium carbonate (curve 15) or 50 ppm sodium carbonate (curve 16). The viscosities observed for the base Kelzan system modified by the addition of 0.5 volume percent isobutyl alcohol and 10 ppm sodium carbonate are illustrated by curve 17 (data points o) and for the system modified by the addition of 0.5 volume percent isobutyl alcohol and 50 ppm sodium carbonate by the curve 18 (data points ●). The samples were aged at 78° C. and the viscosity measurements taken at this temperature in accordance with the procedure described previously. The base Kelzan curve 6 from FIG. 1 is again reproduced in FIG. 3 to provide a basis for comparison.

From an examination of the data presented in FIG. 3, it can be seen that the combination of alcohol and alkali metal carbonate acts synergistically to provide an even greater increase in thermal stability of the Kelzan system over that attained through the use of alcohol alone. A direct comparison for systems containing equal volumes of alcohol may be made between curve 14 of FIG. 3 and curve 11 of FIG. 2. As can be seen from a comparison of these curves, the system containing 50 ppm sodium carbonate exhibited significantly higher viscosities over the aging period than did the system containing only n-butyl alcohol. Curves 14, 15, 16, and 17 of FIG. 3 also illustrate that the addition of the alkali metal carbonate significantly lessens the amount of alcohol necessary to confer thermal stability to the Kelzan system. Thus, curves 15 and 16 in FIG. 3 for systems containing only 0.1 volume percent isobutyl alcohol provided viscosities throughout most of the aging period which were about equal to or even greater than the viscosities observed for the system containing 2.0 volume percent isobutyl alcohol but no alkali metal carbonate.

While any alkali metal carbonate may be employed in carrying out this embodiment of the invention, sodium carbonate usually will be preferred from the standpoint of economy and availability. The biopolymer solution should be buffered at a pH above 7 and preferably above 8.5. On the other hand, the pH of the solution normally should not exceed 10. Within these constraints, the alkali metal carbonate may be employed in any suitable concentration. A preferred concentration range is from 0.0001–0.01 weight percent (10–100 ppm). While greater amounts of alkali metal carbonate may be employed in the stabilized polysaccharide system, it usually will be desirable to limit the alkali metal carbonate concentration to a value not greater than 0.1 weight percent (1,000 ppm).

When the alcohol is employed in conjunction with the alkali metal carbonate, it is preferred to add the alcohol to the system in an amount within the range of 0.1–1.0 volume percent. As indicated by the experimental data shown in FIG. 3, lesser quantities of alcohol can be employed. Thus in a preferred embodiment, the alcohol is present in concentration within the range of 0.1–0.5 volume percent and the alkali metal carbonate in a concentration within the range of 0.001–0.005 weight percent.

The present invention may be carried out utilizing injection and production systems as defined by any suitable arrangement of wells. One well arrangement commonly used in waterflooding operations and suitable for use in carrying out the present invention is an integrated five-spot pattern of the type illustrated in U.S. Pat. No. 3,927,716 to Burdyn et al. Other well arrangements may be used in carrying out the present invention, examples of which are set forth in the Burdyn et al. patent. By the term "pore volume" as used hereafter is meant that volume of the portion of the formation underlying the well pattern employed, as described in greater detail in the Burdyn et al. patent.

While the thickened aqueous solution of stabilized Xanthomonas polysaccharide may be employed as the sole displacing liquid in accordance with the present invention, it usually will be injected as a discrete slug and then followed by a suitable driving fluid. Typically the thickened aqueous liquid will be injected in an amount within the range of 0.1 to 0.5 pore volume and then followed with a driving fluid. The driving fluid typically may be any water which is locally available and is not incompatible with the formation. The driving fluid is injected in such amount as necessary to carry the recovery process to its completion. The thickened aqueous solution of stabilized Xanthomonas polysaccharide may of course be employed in conjunction with various other additives with which it is compatible such as surface-active agents which may be added to the injected water. Thus in a typical application of this nature, a slug of an aqueous solution of a surface-active agent may be injected and thereafter followed by a mobility control slug containing the stabilized Xanthomonas polysaccharide. The mobility control slug may then be followed by a driving fluid as described previously.

I claim:

1. In a method for the recovery of oil from a subterranean oil reservoir having a temperature greater than 60° C. and penetrated by spaced injection and production systems wherein an aqueous liquid is introduced into said reservoir via said injection system to displace oil to said production system, the improvement comprising employing as at least a portion of the fluid introduced into said injection system a viscous aqueous liquid containing a water dispersible polysaccharide produced by action of bacteria of the genus Xanthomonas on a carbohydrate, a $C_4$–$C_5$ aliphatic alcohol in a concentration within the range of 0.1–2.0 volume percent, and an alkali metal carbonate in a concentration within the range of 0.001–0.1 weight percent.

2. The method of claim 1 wherein said alcohol contains 4 carbon atoms.

3. The method of claim 1 wherein said alcohol is selected from the group consisting of n-butyl and amyl alcohols and is present in a concentration within the range of 0.1–1.0 volume percent.

4. The method of claim 1 wherein said alcohol is n-butyl alcohol present in a concentration within the range of 0.1–0.5 volume percent.

5. The method of claim 1 wherein said alcohol is isobutyl alcohol.

6. The method of claim 5 wherein said isobutyl alcohol is present in a concentration within the range of 0.1–1.0 volume percent and said alkali metal carbonate is present in a concentration within the range of 0.001–0.01 weight percent.

7. The method of claim 5 wherein said isobutyl alcohol is present in a concentration within the range of 0.1–0.5 volume percent and said alkali metal carbonate is present in a concentration within the range of 0.001–0.005 weight percent.

8. The method of claim 1 wherein said alcohol is selected from the group consisting of n-butyl and isobutyl alcohols.

9. The method of claim 1 wherein said alcohol is n-butyl alcohol in a concentration within the range of 0.1–1.0 volume percent and said alkali metal carbonate is present in a concentration within the range of 0.001–0.01 weight percent.

10. The method of claim 1 wherein said n-butyl alcohol is present in a concentration within the range of 0.1–0.5 volume percent and said alkali metal carbonate is present in a concentration within the range of 0.001–0.005 weight percent.

* * * * *